United States Patent [19]

Fuller

[11] Patent Number: 5,179,653

[45] Date of Patent: Jan. 12, 1993

[54] 3-TIER MENU SYSTEM

[75] Inventor: Charles E. Fuller, Auburn Hills, Mich.

[73] Assignee: Deneb Robotics, Inc., Auburn Hills, Mich.

[21] Appl. No.: 677,579

[22] Filed: Mar. 29, 1991

[51] Int. Cl.⁵ .............................................. G06F 3/14
[52] U.S. Cl. .................................... 395/156; 395/161
[58] Field of Search ............... 395/155, 156, 157, 159, 395/161; 340/716, 721, 723

[56] References Cited

U.S. PATENT DOCUMENTS

| | | | |
|---|---|---|---|
| 4,742,473 | 5/1988 | Shugar et al. | 364/578 X |
| 4,821,211 | 4/1989 | Torres | 395/160 X |
| 4,862,389 | 8/1989 | Takagi | 395/156 |
| 4,896,291 | 1/1990 | Gest et al. | 395/156 |
| 4,926,349 | 5/1990 | Thor | 395/156 |
| 4,970,683 | 11/1990 | Harshaw et al. | 395/155 |
| 5,119,475 | 6/1992 | Smith et al. | 395/160 X |

Primary Examiner—Heather R. Herndon
Attorney, Agent, or Firm—Dykema Gossett

[57] ABSTRACT

A menu system incorporates a display surface having sets of buttons displayed thereon. Some sets of buttons are operative to initiate various functions and other sets of buttons are operative to define which functions, from a monolithic set of functions, are made selectable at a given time. Accordingly, the system provides a generic menu system which can easily handle hundreds of menu options in a way which is easy to learn and master.

14 Claims, 9 Drawing Sheets

3-TIER MENU SYSTEM

BACKGROUND OF THE INVENTION

This invention relates generally to software menu systems, and more specifically relates to software menu systems used in monolithic graphics applications.

Software menus are used widely as a tool to indicate to a software user what his various options may be. In its most simplest form, a menu presents the user with a list of options he may select from and provides the appropriate software to respond and implement his selection.

While the majority of software applications do not necessitate large complex menus, it is generally true that, the more complex the software, the greater the need for more menu selections. Thus, in complex application programs, it is not uncommon for there to be hundreds, or even thousands, of options which the user must select from. Many graphics applications fall into the general class of software which necessitates that, at any one time, hundred of options be available to the user. Such large programs are often known as monolithic programs.

It is generally known that the success a given piece of software finds in the marketplace is, at least in part, due to the ease in which it can be learned. This, in turn, is often directly based on the ease at which the program can be used without first requiring that a user spend hours studying user manuals. While traditional menu schemes which use a tree or branch approach work well in applications having ten or twenty options, they are wholly inadequate for handling monolithic applications. This is primarily due to the fact that conventional menu schemes which use a branch or tree approach necessitate that a user back out of (or retraces steps) every time he wishes to exit a particular branch of the menu. While this is not overly cumbersome for small applications, in monolithic applications, the branches become sufficiently broad and deep such that conventional menu systems, at best, are frustrating and cumbersome to use and at worse, lead to abandoning use of the software altogether.

Thus, it can be seen, that there is a need for a menu system for use with monolithic software applications which logically and conveniently presents to the user hundreds of functions in a way in which they are easily assimilated and mastered.

It is an object of this invention to provide a menu system for use on monolithic software applications which provides a user with easy access to hundreds of selections in a format which is easy to use and understand.

It is an additional object of this invention to provide a menu system for use in monolithic software applications wherein the menu system is not applications specific and accordingly, can be applied to any software applications program in which the user must select from a large number of options.

SUMMARY OF THE INVENTION

The menu system of the present invention is generally to be used in conjunction with a display terminal of a computer. The system generally comprises a display surface on the terminal, software for displaying, on the terminal display surface, first and second sets of menu selection buttons. The software is responsive to a user's selection of a button in the first set of buttons for displaying indicia on each of the buttons in the second set of buttons. The displayed indicia indicates a respectively associated function which is executed by the computer in response to the selection of the button associated with the function. Software is responsive to the selection of a button in the second set of buttons for executing the function respectively associated with the selected button in the second set of buttons.

Preferably, software is provided to, in some manner, visually alter the look of the button which is selected so that it stands out from the non-selected buttons.

In a preferred embodiment, a third set of buttons are provided on the display surface of the terminal wherein each of the buttons in the third set of buttons is respectively associated with a function, whereby each of these functions are executed by the computer in response to the selection of the button associated with the function. Preferably the functions associated with the third set of buttons are fixed and not changed by the selection of a button from the first set of buttons.

In a preferred embodiment, software is provided for storing information indicative of which buttons in the first and second set of buttons was last selected. When the user wishes to jump back to the option he was previously in, he simply selects the button, from the first set of buttons, which corresponds to his prior mode. The system is provided with software for automatically selecting the buttons corresponding to the information stored about his last selected mode and acts on this information to return him to his previous mode.

This system preferably include a mouse or the like for selecting the buttons in the first and second set of buttons.

The system preferably includes a third set of buttons displayed on the terminal display surface wherein each function respectively associated with the indicia displayed on each button in the second set of buttons further includes software responsive to the selection of a button in the second set of buttons for displaying indicia on each of the buttons in the third set of buttons, the displayed indicia on each button in the third set of buttons indicating a respectively associated function executed by the computer in response to the selection of a button in said third set of buttons. Software is responsive to the selection of a button in the third set of buttons for executing the function respectively associated with the selected button from the third set of buttons.

In a second aspect, the present invention provides a menu manager comprising a display device, a cursor control device and a programmed apparatus for controlling the display device. The programmed apparatus includes software which is responsive to the control device for displaying on the display device, first, second and third sets of buttons. Software is provided which is responsive to the use of the cursor control device in selecting a button in the first set of buttons for displaying a label on each of the buttons in the second set of buttons. Each label is respectively associated with a unique set of labels which are placed on the third set of buttons in response to the selection of one of the buttons in the second set of buttons. Software is responsive to the use of the cursor control device in selecting a button in the second set of buttons for displaying a label on each button in the third set of buttons. Each label on each button in the third set of buttons is indicative of a respectively associated function which is executed by the programmed apparatus in response to the use of the cursor control device in selecting a button in the third set of buttons. Software is made responsive to the use of the cursor control device in selecting a button in the third set of buttons for executing a function respectively associated with the selected button in the third set of buttons.

In a third aspect the present invention provides a method of supporting a plurality of menu selections on a display screen of the computer. The method generally comprises the steps of defining first, second and third display zones on the display screen, simultaneously displaying first, second and third sets of selection buttons in the first, second and third display zones respectively, defining and displaying in the first zone, a first set of menu options, wherein each option is associated with a selection button in the first zone, selecting and displaying a second set of menu options, in response to a selection of one of the menu options in the first set of menu options, wherein each menu option in the second set is associated with a selection button in the second set of selection buttons, and selecting and displaying a third set of menu options, in response to a selection of one of the menu options in the second set of menu options, wherein each menu option in said third set is associated with a function to be carried out by the computer.

Preferably, the method includes the step of indicating when a menu option has been selected by changing the visual representations of the selected button from that of the buttons associated with non-selected menu options.

Also, the method preferably include the steps of defining a fourth zone on the display screen, displaying a fourth set of selection buttons within the fourth zone, and defining and displaying within the fourth zone a fixed set of menu options, wherein each option is associated with a selection button in the fourth set of selection buttons. Preferably the method also includes the steps of continually storing the most recent set of menu options selected and automatically returning the system status to the status defined by the most recent options, in response to a selected menu option in the first set of menu options.

Other advantages and meritorious features of the present invention will become more fully understood from the following description of the preferred embodiments, the appended claims and the drawings, a brief description of which follows.

DETAILED DESCRIPTION OF THE PRFERRED EMBODIMENTS

Figure 1:
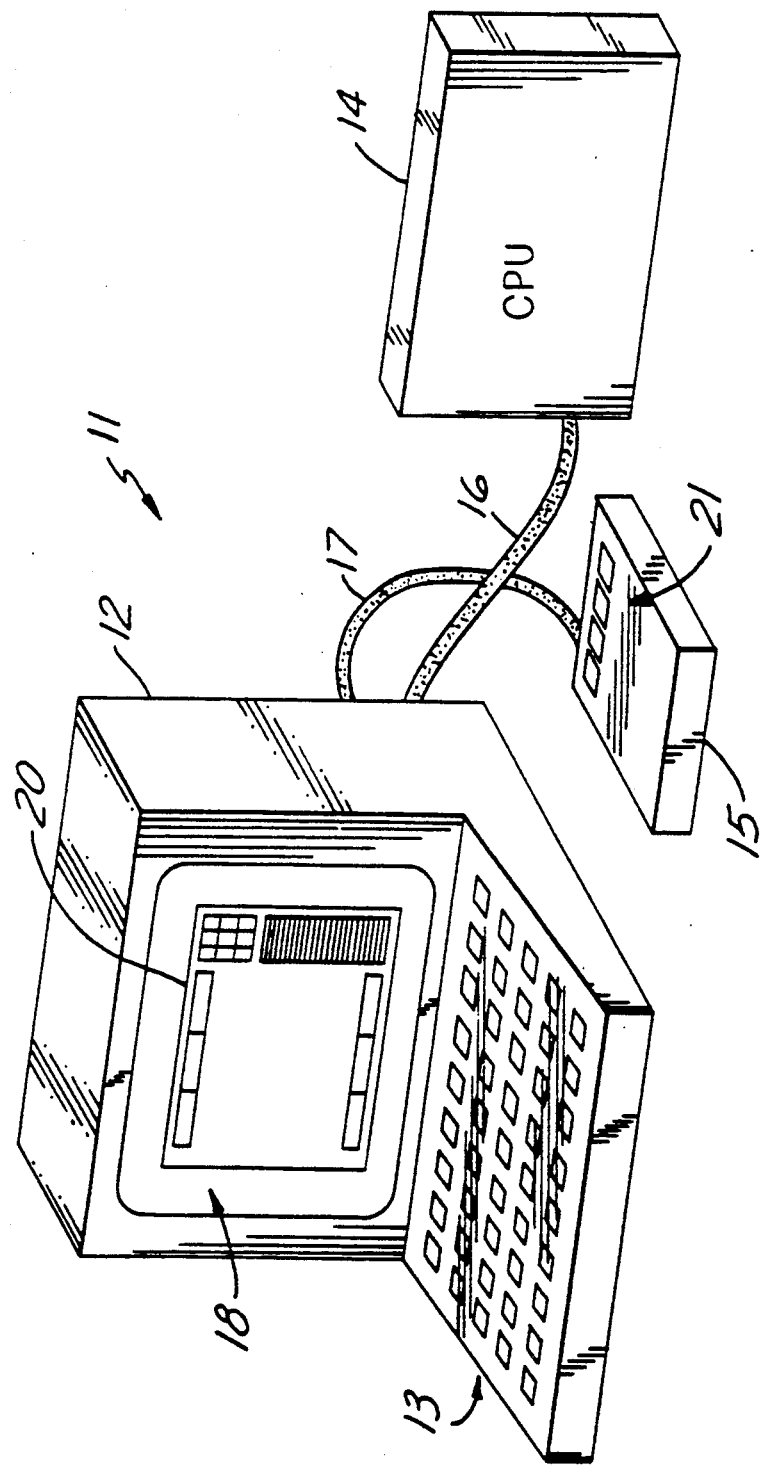
FIG. 1 is a diagrammatic view of a conventional arrangement of a computer and its supporting peripherals.

Now referring to FIG. 1, conventional computer system 11 comprises display terminal 12, keyboard 13, CPU 14 and remote cursor control 15. CPU 14 is connected to display terminal 12 via interconnect cable 16 and remote cursor control 15 is connected to display terminal 12 via interconnect cable 17. Display terminal 12 includes display surface 18 for displaying communication information from CPU 14 to a user of computer system 11. As depicted in FIG. 1, display surface 18 is shown having displayed on it an embodiment of the menu system 20 of the present invention. Menu system 20 comprises a plurality of zones and each zone is comprised of a plurality of buttons. The zones and the buttons will be described in detail in conjunction with the subsequent drawings. Keyboard 13 provides a way for the user of system 11 to communicate with CPU 14. Likewise, remote cursor control 15 (commonly known as a "mouse") provides a way for communications to take place between the user of system 12 and CPU 14. It is important to note, that the menu system of the present invention, while shown operating in conjunction with computer system 11, is truly a generic menu system, and consequently, it can operate on any computer system which uses a display terminal to communicate between the user and the CPU. Accordingly, the menu system of the present invention is not limited, in any way, to operating on specific terminal devices or specific computer hardware.

Figure 2:
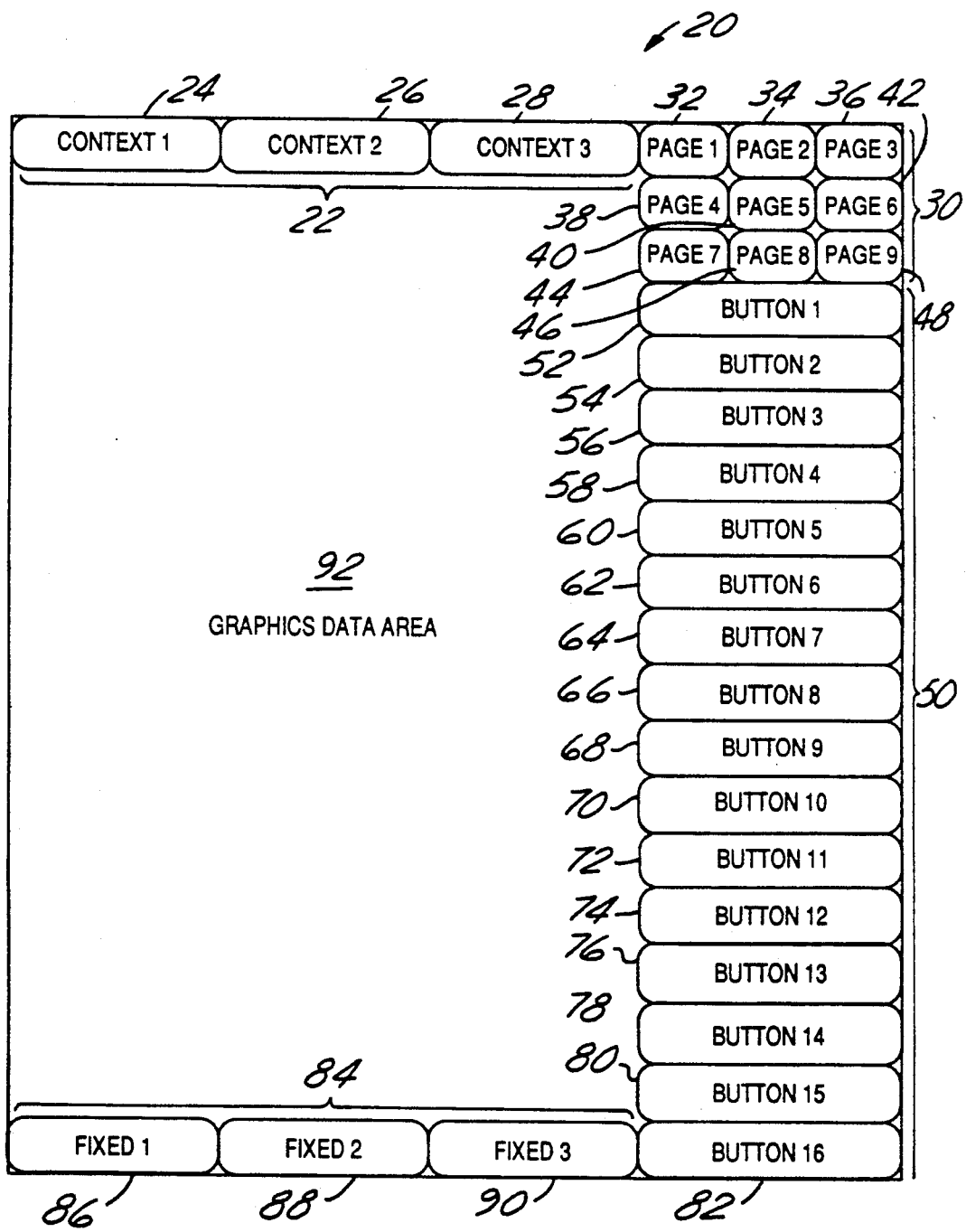
FIG. 2 is a graphical representation of a computer display screen showing the preferred layout of the menu of the present invention.

Now referring to FIG. 2, layout 20 of the menu system of the present invention generally includes segregating the display surface 18 of the data terminal 12 into distinct regions or zones. Zone 1 is known as the context zone 22 and generally includes context buttons 24, 26 and 28. The second zone is termed the page zone and is generally referenced at 30 and includes nine page buttons 32–48. The third zone is known as function zone 50 and includes sixteen function buttons 52–82. The fourth zone (the fixed function zone) 84 is comprised of three fixed function buttons 86–90. The final zone, zone 5, comprises the remaining portion of the display surface 92. The area defined by zone 5 is typically used by the application software to display text data, graphics data or the like.

In any applications software, various functions must be performed by the software, and accordingly, their use must be made accessible to the user. The purpose of fixed zone buttons 86–90 and functional zone 50 buttons 52–82 is to make various system functions available for accessing. For example, if the menu system displayed in FIG. 2 was used in conjunction with a graphics application program (such as a CAD/CAM system or the like), buttons 52–82 could provide the user with various options such as those common to CAD/CAM software. Such options would include rotate left, rotate right, zoom in, zoom out, scale, etc. Instead of each button being labelled button 1, button 2, etc. (as is shown in FIG. 2) each button would be uniquely labelled with the function performed by a computer when that button is selected. The only difference between fixed zone buttons 84 and function zone buttons 50 is that the functions associated with fixed zone buttons 84 remain fixed at all times. Thus, for functions which are true utility functions and accordingly, are used in many different modes of operation of the software, they are made constantly available by fixing their accessibility on the display surface.

In contrast to fixed zone buttons 84, function zone buttons 50 are each 52–82 associated with a function (such as zoom in, zoom out, etc.) but this function is not fixed and can be changed by simply selecting one of the page buttons 32–48 in page zone 30. For example, using our CAD/CAM example once more, page button 32 may give the user various color selection options. Page button 34, may give the user various surface texture options. Accordingly, if page button 32 is selected, the text on function button 52 may read "RED" thus allowing the user the option of creating a graphic display consisting of red lines and red surfaces. Likewise, function buttons 54–82 may each specify additional colors thereby giving the user the option of creating multi-color graphics. However, when page button 34 selected the functions associated with function buttons 52–82 no longer relate to color select options but are automatically changed to now give the user the ability to select from various new functions. For example the user may select from various surface textures in constructing various graphic designs. For example, the user may be able to select a surface texture similar to that of a brick wall, or that resembling cross hatching, pocking or the like. Thus it can be seen that with each selection of a button from page zone 30, function buttons 52–82 are automatically redefined to give the user a number of selectable options. Accordingly, it can be seen from the above discussion, that the selection of a page button defines the functions associated with each of the sixteen function buttons 52–82.

In the same way that a selection of one of the page buttons 32–48 was used to define the functions associated with function buttons 52–82, context buttons 24–28 are used to define the functions associated with page buttons 32–48. Thus, continuing once again with our CAD/CAM example, context button 24 may be selected when the user wishes to create a new part geometry. Context button 26 may be used when the user wishes to alter, or rearrange an existing component geometry and context button 28 may give the user the option of performing various mathematical functions such as determining component volume, surface areas, masses, etc. Accordingly, each context button 24–28 defines a group of nine page and each page, in turn, defines a group of sixteen buttons.

It is important to note, that although the term "button" has been used above, and will be used throughout the disclosure, to describe the fundamental segregations within each zone 22, 30, 50 and 84, it does not represent a physical button which is activated by physical contact, such as by touching. Rather, the term "button" is a convenient way to define these fundamental segregations which make up each zone 22, 30, 50 and 84 because, in fact, they act like their physical counterparts. It is well known in the art that software can be written to be responsive to the placement and activation of a cursor on display surface 18. When the computer user wishes to select a button, he simply positions the cursor over the desired button by manipulating one of the keys on keyboard 13 or mouse 15, and then selects the button proximate the cursor by activating a second key on keyboard 13 or one of the keys 21 on mouse 15. Thus, it is to be understood, that the menu system of the present invention is not limited to the notion of a physical button, but rather incorporates the broader concept of a predefined segment of a display surface. It is also important to note that, although for convenience, the various zones have been shown to have a fixed number of buttons associated therewith, this does not necessarily have to be the case. For example, suppose after selecting page button 32 in page zone 30, the sixteen function buttons 52–82 appear as shown in FIG. 2. Now, further suppose that upon the selection of page button 34, twice as many functions must be provided to the user. To accommodate this two-fold need, buttons 52–82 can be removed from the screen and twice as many new buttons can be displayed in their place. Thus, it is understood, that the menu system of the present invention contemplates varying the number of displayed function buttons in response to a predetermined page button. By analogy, the same scheme can be employed to vary the number of page buttons displayed, in response to an associated context button.

It can be easily seen from the above discussion that the menu system of the present invention offers a large number of options to the software user in a very straightforward manner and a manner which is easy to learn and utilize. For example, the menu system set out in FIG. 2 allows the user to exercise 432 options by simply selecting a zone 1 button 22, a zone 2 button 30 and a zone 3 button 50. If fixed functions are counted the number of options increases to 435. If a conventional branch-type menu system was used to implement 435 options, it would, at best, be cumbersome to use and also difficult to keep track of where you are within the menu structure. In contrast, the disclosed menu system of the present invention provides a compact and "visually manageable" menu system which practically allows the user to educate himself in how to use a given software application. It is important to note that many additional functions could be accessed by simply dividing function buttons 52–82 in half thereby doubling the number of function buttons and increasing the total number of options to 867. With the above discussion in mind, the remaining figures will be used to describe various features of the disclosed menu system and the details of its function.

Figure 3:
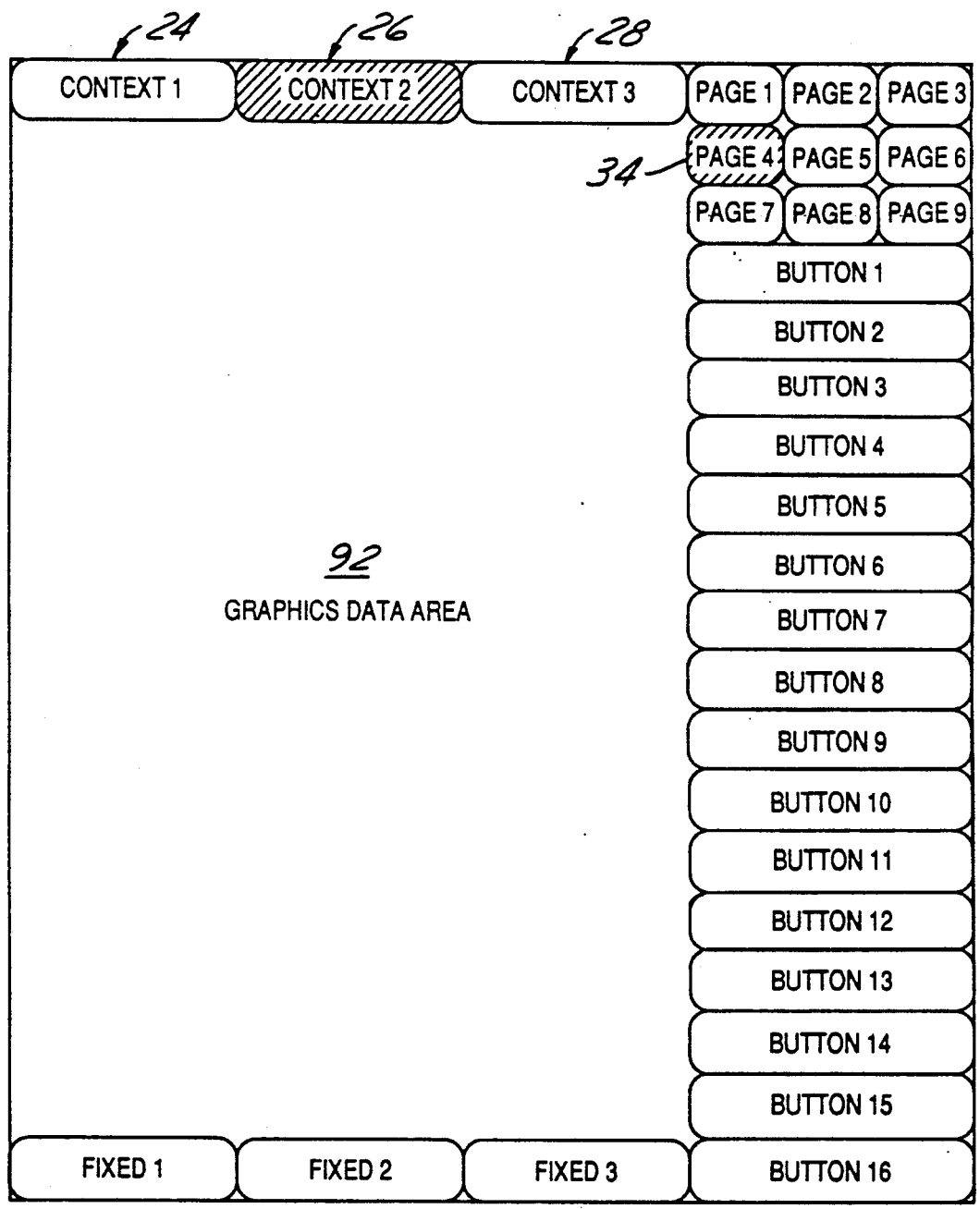
FIG. 3 is a graphical representation of a computer display screen showing the preferred layout of the menu of the present invention wherein menu options C2 and p4 have been activated.

Now referring to FIG. 3, when an application program is first entered into, the menu system of the present invention preferably appears to the user as it is shown in FIG. 3. A predetermined context button and a predetermined page button are automatically selected by the system. Thus, as can be seen in FIG. 3 context button 26 and page button 34 have been selected at the default selections upon start-up. Although any context and any page can be selected as default upon start-up, it is generally considered sound programming practice to have a given context and page initially entered into upon start-up. This prevents the user from entering the application in an undefined state.

Figure 4:
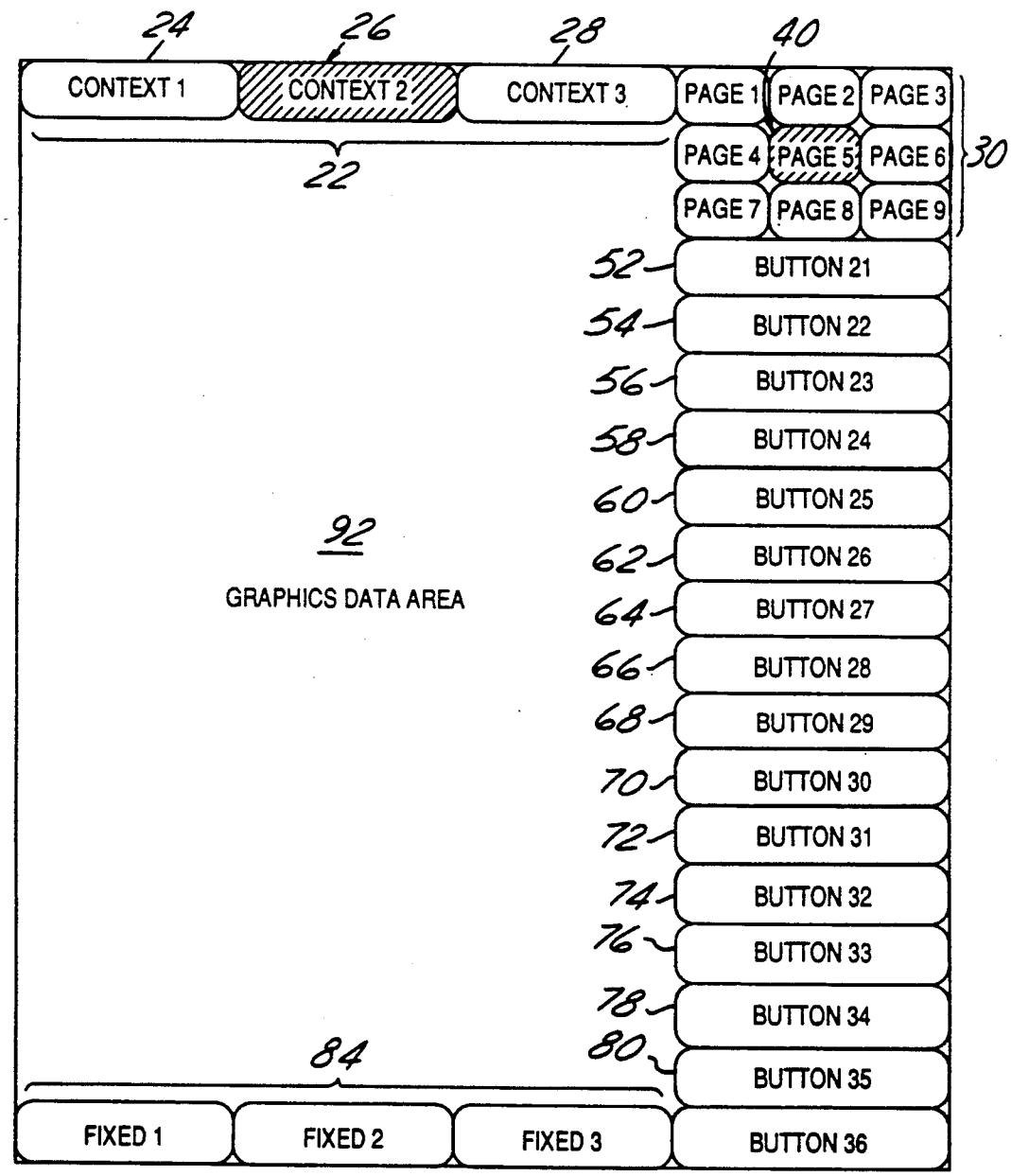
FIG. 4 is a graphical representation of a computer display screen showing the preferred layout of the menu of the present invention wherein menu options C2 and p5 have been activated.

Now referring to FIG. 4, suppose that the user wishes to stay in context 2 (whatever that is defined to be) but wishes to switch from page 4 to page 5. In order to select button 40 the user simply indicates that button 40 is his selection by positioning the cursor over button 40 and then activating the appropriate selection key. This can be done by way of keyboard entry 13, use of "mouse" 15 or the like. Once the user selects page button 40, the labels set out on function buttons 52-82 (labels shown as B1-B16) no longer indicate the function they did when page 4 was selected, but rather they now indicate the newly assigned functions (new labels indicated by B21-B36) which are associated with the selection of page button 40. It is important to note that at no time during the selection of context buttons 22 or page buttons 30 does the function associated with fixed function buttons 84 change. As was discussed above, this is the case because the functions associated with fixed function buttons 84 are typically those functions which transcend pages and contexts and accordingly, must be made accessible regardless of where one is at in the application software. It is also important to note that there is nothing to prohibit the use of one or more function buttons 52-82 from functioning in a help mode. For example, the function buttons 52-82 could be separated down the middle and the left side portion could be labelled to reflect a specific function to be executed upon the selection of that button and the right side portion could be simply labelled as "HELP". In this way, if the user was ever confused about what purpose a particular button serves, he would simply select the help button nearest the function button and a detailed tutorial could be presented to him (in area 92 of terminal display surface) describing the purpose of the given function and how it is to be used.

Figure 5:
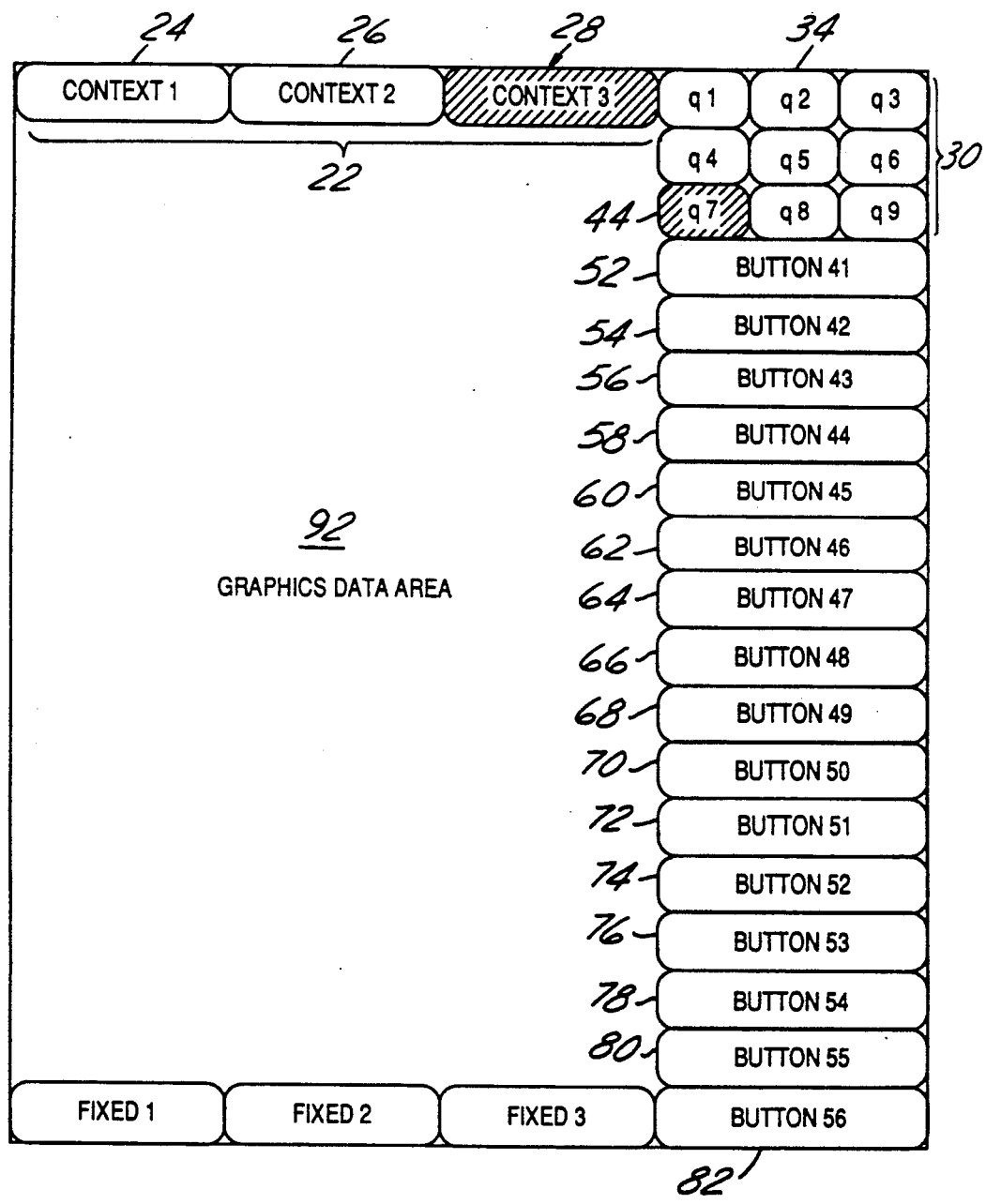
FIG. 5 is a graphical representation of a computer display screen showing the preferred layout of the menu of the present invention wherein menu options C3 and q7 have been activated.

Now referring to FIG. 5, assuming that the user wishes to leave context C2, page p5 and jump to context C3, he simply selects context button 28 using one of the aforementioned techniquies. Accordingly context button 28 changes its shade, or in some other way visibly indicates to the user that it has now been selected and accordingly context button 26 is made to look like the other non-selected buttons. Upon selecting context button 28, a page button (for example q7) is automatically selected as part of the preferred method of the present invention. For the same reason that it does not make sense for a user not to be in a defined context, it likewise does not make good programming sense for a user to operate without being in a selected page. For this reason, the user is always within a given context and always within a given page, even if those are selected by default. It is important to note that when page button q7 is selected upon entering the mode depicted in FIG. 5, the functions set out in association with function keys 52-82 are again redefined over what they were in context C2, page p5. As discussed above, the ability of the menu system of the present invention to redefine the functions associated with function keys 52-82 for each unique selection of a context button 22 and a page button 30 is what gives the present system its ability to break down a monolithic application program into small manageable parts in a way which makes it easy for a user to "find his way around" the system.

Figure 6:
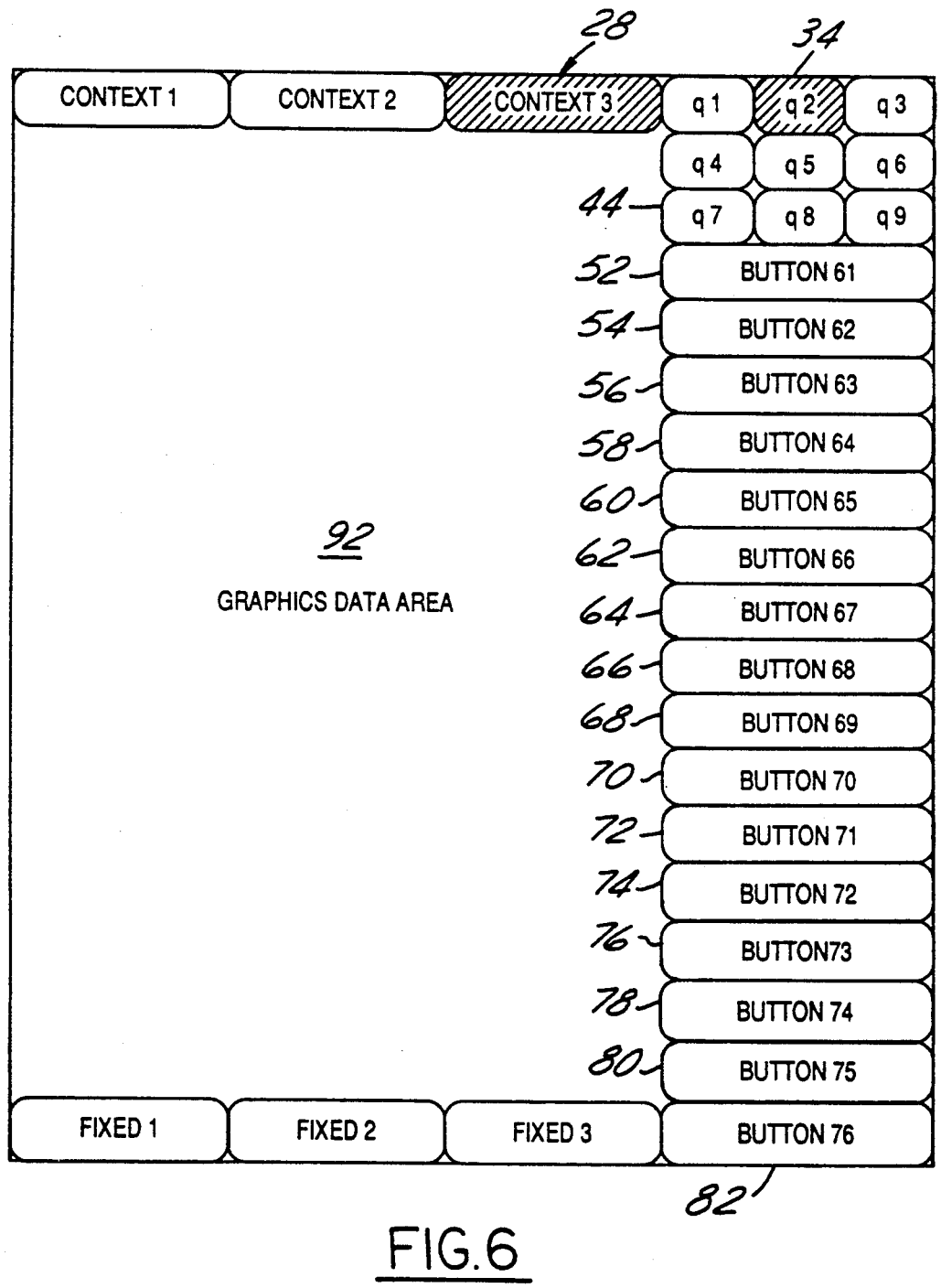
FIG. 6 is a graphical representation of a computer display screen showing the preferred layout of the menu of the present invention wherein menu options C3 and q2 have been activated.

Now referring to FIG. 6, once the user enters into context C3, he may not wish to stay in the functions B61-B76 defined by button 44. Moreover he may wish to switch from button 44 to the functions defined by page button 34. If this is the case, he simply selects page button 34 wherein the functions associated with function buttons 52-82 change from functions B41-B56 to functions associated with B61-B76. A unique feature of the present invention known as "context popping" will now be discussed in conjunction with FIGS. 4, 6 and 7.

Figure 7:
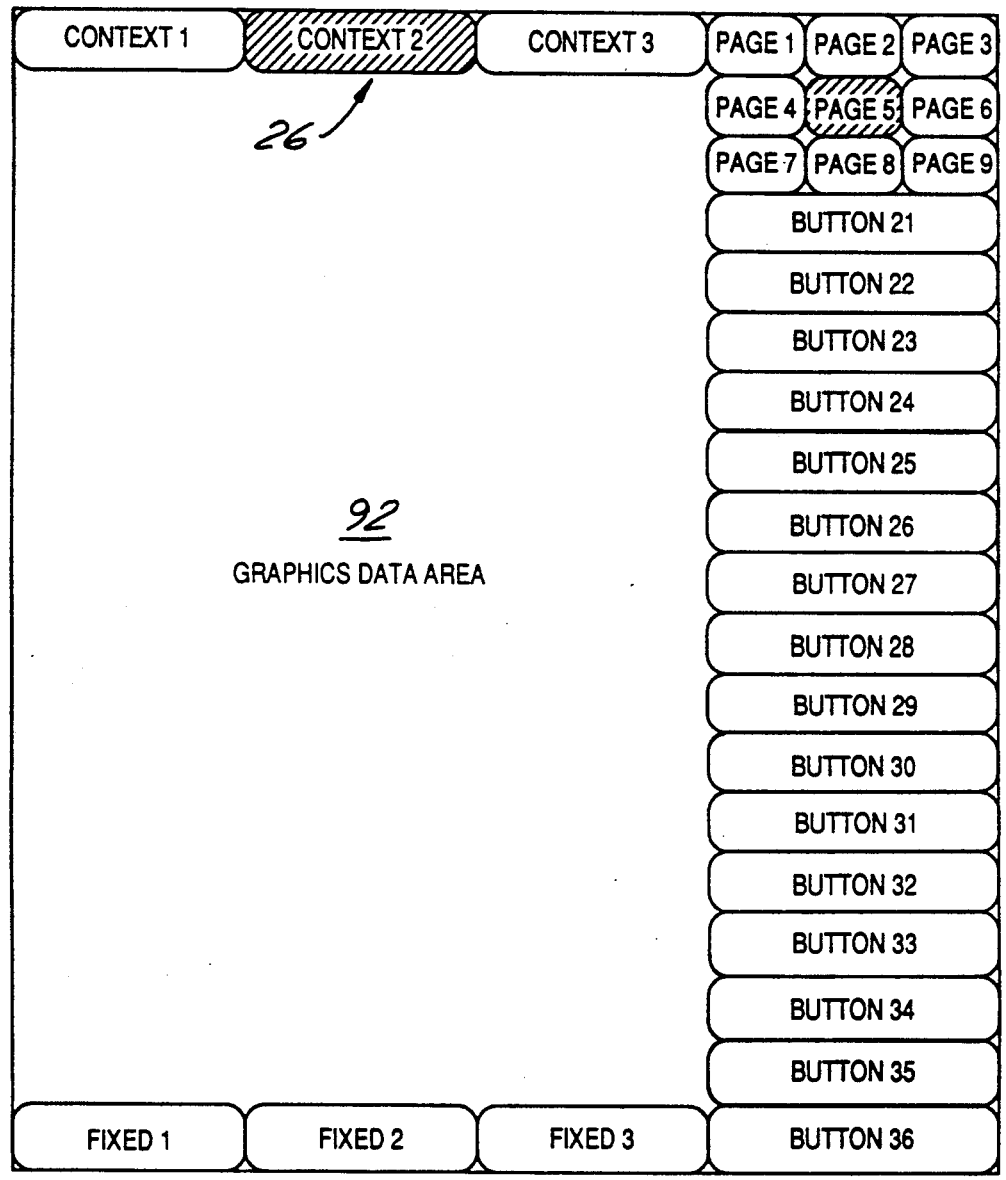
FIG. 7 is a graphical representation of a computer display screen showing the preferred layout of the menu of the present invention wherein menu options C2 and p5 have been activated.

Now referring to FIGS. 4, 6 and 7, as is often the case when a user is jumping from one context to the other, he simply exits one context for a short period to perform a function which is not presently available to him in his present context, and then quickly returns to his present context after executing a given function. For example, assume that the user was in context C2, page p5 as depicted in FIG. 4 and wished to momentarily jump to a function found in context C3, page q2. If this was the case, he would select context button 28 (as shown in FIG. 5) which would place him in context C3, page q7. He would then select page button 34 which would put him in the context and page mode he desired. When he was finished in context C3, page q2 and was ready to return to the context he was immediately previously in, (context C2, page p5) he would simply select the context button 26 and the menu system of the present invention would automatically place him in his previous page, p5 as shown in FIG. 7. Thus it can be seen that a preferred characteristic of the menu system of the present invention is one in which whenever a context is selected, the default page which is entered into is always the page which was last active before switching out of that context. This scheme can also be applied one step further and the immediately previous function in which the user was in can be automatically re-entered upon context popping. Thus, the menu system of the present invention automatically backtracks to the previous active page and active function, within a given context.

Figure 8:
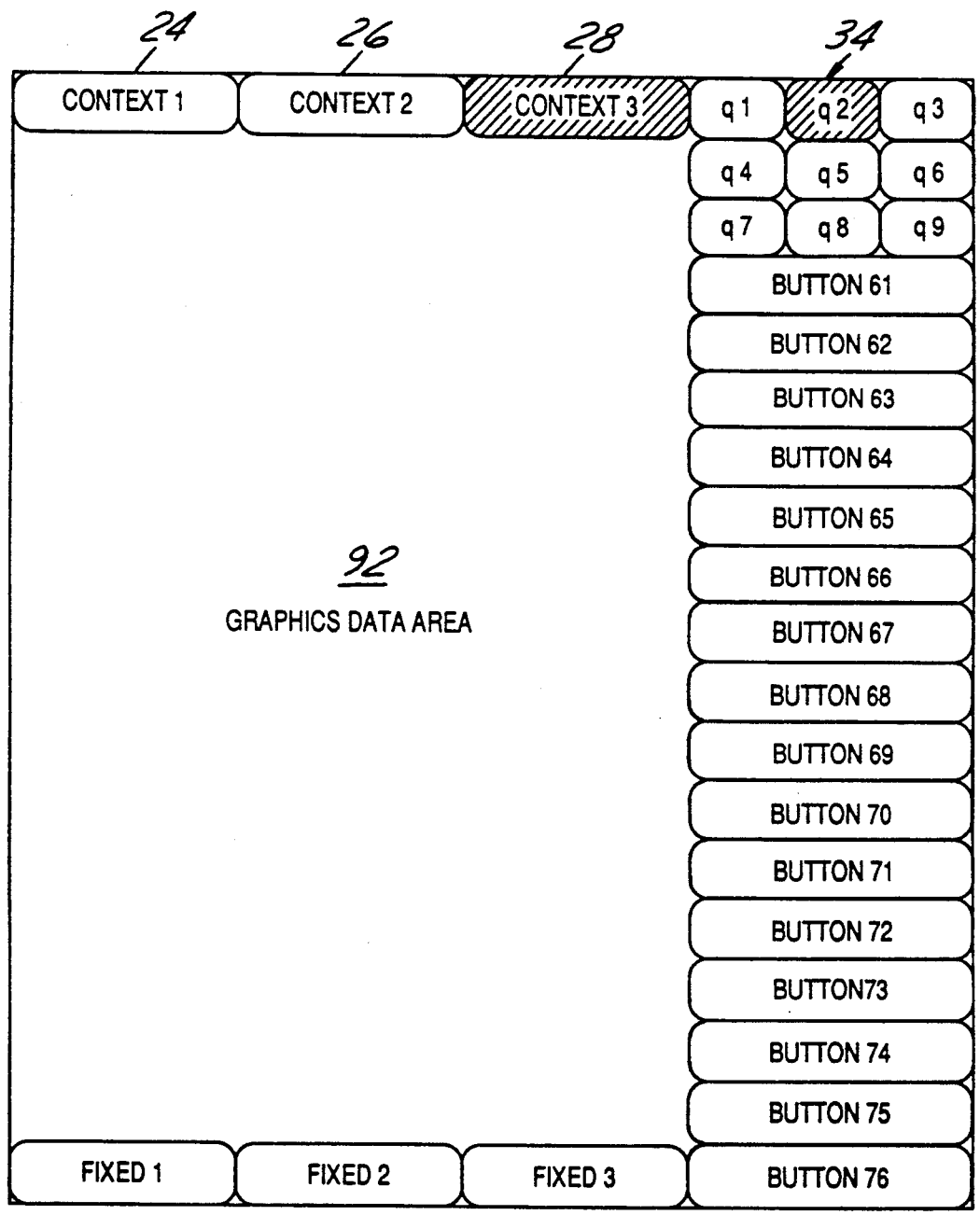
FIG. 8 is a graphical representation of a computer display screen showing the preferred layout of the menu of the present invention wherein menu options C3 and q2 have been activated.

Now referring to FIG. 8, with the user in context C2, page p5 and wishing to jump to his previous location in context 3, he simply selects context button 28 wherein page q2 (or button 34) is automatically selected.

Before describing the flow diagram associated with the menu system of the present invention, it is important to highlight some of the more subtle, but nonetheless important features, of the menu system of the present invention. Firstly, as depicted in the layout of the menu buttons of the present invention the area dedicated to establish the menu buttons is minimized. This in turn, maximizes graphics data area 92 of the screen. Secondly, the buttons associated with each zone 22, 30, 50, 84 and 92 are logically grouped in a distinct area of the terminal display surface. For example, as shown in the figures, context zone 22 is well suited to fit along the top of the display surface, page zone 30 is well suited to reside along the upper righthand side of the display surface and function buttons are well suited to reside in a column along the righthand edge of the display screen. By locating all of the buttons associated with a given zone in a distinct area of the screen, the user can immediately distinguish between context, page and function buttons. It is also believed to be helpful if the buttons associated within a given zone share a common color or are otherwise made distinct from buttons in other zones. Lastly, it is preferred that fixed buttons 86-90 remain in a fixed location on the screen regardless of the present context or page. This is an obvious choice, inasmuch as fixed buttons usually represents special functions and must be accessible at all times.

Figure 9:
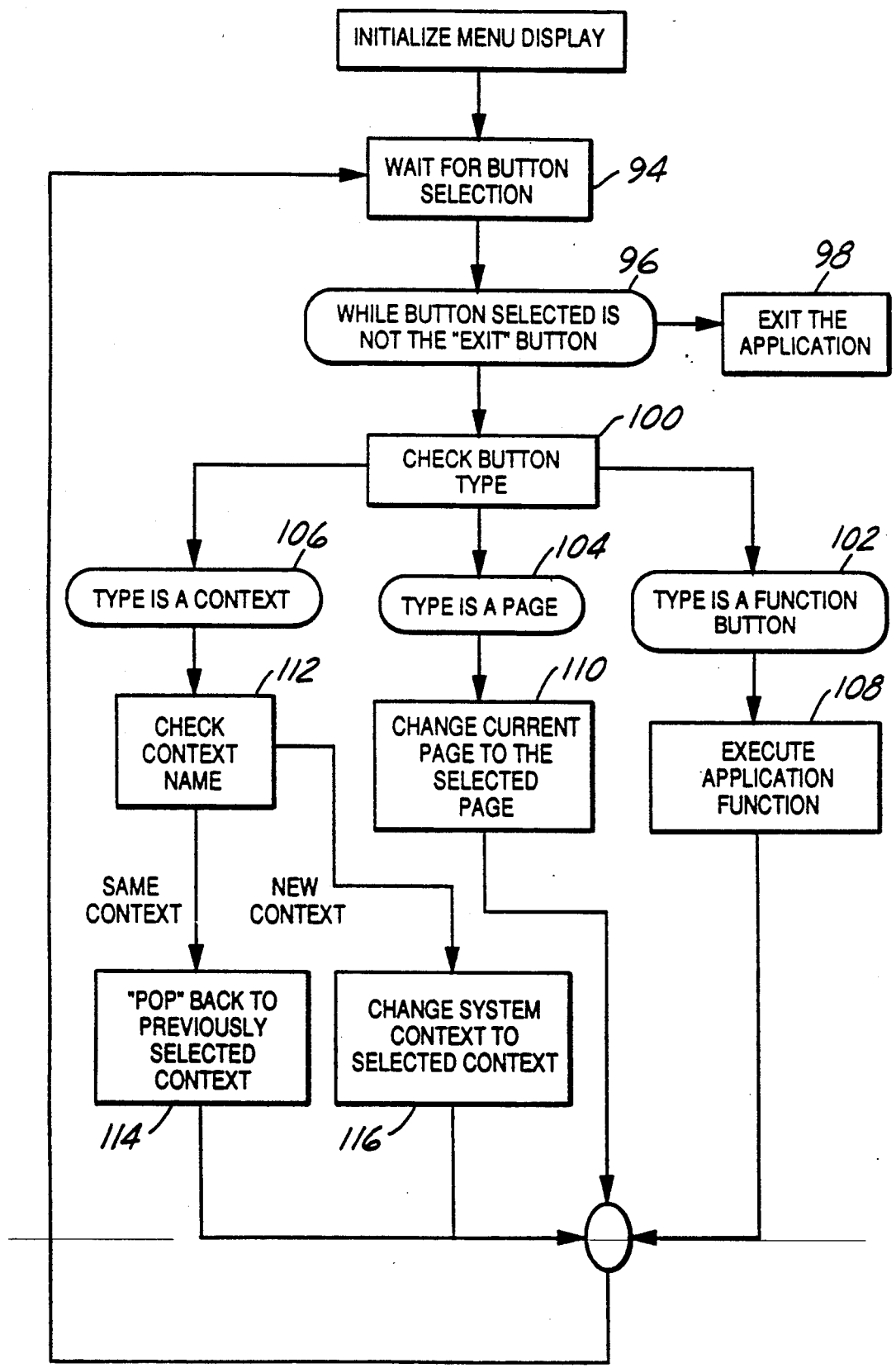
FIG. 9 is a logic flow diagram of the operation of the menu system of the present invention.

Now referring to FIG. 9, within the software system of the present invention, there is a standard utility program which constantly runs, polling the user input device (such as keyboard 13, mouse 15 or the like). Upon sensing that a button 24-28, 32-48, 52-82 or 86-90 has been selected, the utility program ceases its waiting function 94 and proceeds to determine if the user has selected to exit the utility 96. If the user has selected to exit the utility, the menu allows the user to exit the application software 98 and control is relinquished by the application software and turned over to the computer system operating system or the like. If the user has not selected to exit the application, the button-type is checked 100 to determine if a function button 102, a page button 104 or a context button 106 has been selected. If a function button 102 is selected the menu system simply executes or turns control over to the appropriate software to execute the application function 108. After the application function 108 is executed the menu system goes into its wait mode 94 to wait for another button selection. If a page button is selected 104 the current page is changed to the selected page 110 wherein the menu system then goes into its wait for button selection mode 94.

If a context button is selected 106, a check is made 112 to determine if the same context has been selected as that which the user is presently in. If the user has selected the same context he is presently in, the system recalls the context and page location which was previously occupied by the user and the user is popped back into his previous context and page 114 (as was mentioned previously, the menu system of the present invention contemplates popping the user back into his previous function, in applications where this feature is desirable). If the user has selected a new context, the system simply changes the system context to the selected context 116. After completing the tasks in modes 114, 116 the system goes back into its wait mode 94 waiting for the next button to be selected.

The foregoing detailed description shows that the preferred embodiments of the present invention are well suited to fulfill the objects of the invention. It is recognized that those skilled in the art may make various modifications or additions to the preferred embodiments chosen here to illustrate the present invention, without departing from the spirit of the present invention. For example in a prototype of the present invention, buttons 24-26, 32-48, 52-82 and 86-90 were graphically depicted as having raised surfaces to simulate the look of a physical button. Accordingly, it is to be understood that the subject matter sought to be afforded protection hereby should be deemed to extend to the subject matter defined in the appended claims, including all fair equivalents thereof.

I claim:

1. A three-tier menu system for use on a display terminal of a computer, comprising:
    a display surface on said terminal,
    means for simultaneously displaying, on said terminal display surface, first, second, and third sets of buttons,
    means, responsive to a user's selection of a button in said first set of buttons, for displaying on said display surface labeling indicia in association with each button in said second set of buttons, whereby said labeling indicia associated with each button indicates a broad group of functions,
    means, responsive to the selection of a button in said second set of buttons, for displaying labeling indicia in association with each button in said third set of buttons, said labeling indicia associated with each button in said third set of buttons indicating a specific function to be performed by said computer when a button in said third set of buttons is selected,
    means, responsive to the user's selection of one of the buttons in said third set of buttons, for executing the function associated with the button selection from the third set of buttons.

2. The menu system of claim 1, further including means for visually indicating which buttons in said first and second set of buttons are presently selected.

3. The menu system of claim 1, further including means for storing information indicative of which button in the first set of buttons and which button in the second set of buttons was immediately, previously selected by the user, and means, response to the user selecting a button in said first set of buttons, for automatically selecting the buttons immediately, previously selected.

4. The menu system of claim 1, further including means for selecting buttons in said first and second sets of buttons.

5. The menu system of claim 4, wherein said selecting means includes a cursor control device.

6. The menu system of claim 1, further comprising means for displaying a third set of buttons on said terminal display surface, and wherein said executing means further includes, means responsive to the selection of a button in said second set of buttons, for displaying labeling indicia in association with a plurality of buttons in said third set of buttons, said labeling indicia in association with one or more of the buttons in said third set of buttons indicating a respectively associated function executed by said computer, in response to the selection of the button associated with each function,
    means, responsive to a selection of one of the buttons in said third set of buttons, for executing the function associated with the button selected from the third set of buttons.

7. A menu manager, comprising:
    a display device,
    a cursor control device,
    a programmed apparatus for controlling said display device, said apparatus including,
    means, responsive to said cursor control device for simultaneously displaying on said display device, first, second and third sets of buttons,
    means, responsive to the use of said cursor control device in selecting a button in said first set of buttons, for displaying on said display device labels from a first set of labels, wherein each label displayed from said first set of labels is respectively associated with a button in said second set of buttons, wherein each said label in said first set of labels is associated with a sub-set of labels from a second set of labels,
    means, responsive to the use of said cursor control device in selecting a button in said second set of buttons, for displaying on said display device a sub-set of labels from said second set of labels, wherein each label displayed from said sub-set of labels from said second set of labels is respectively associated with a button in said third set of buttons, wherein each said label from said sub-set of labels indicates a function which is executed by said programmed apparatus, in response to the use of said cursor control device in selecting a respectively associated button from said third set of buttons, and means, responsive to the use of said cursor control device in selecting a button in said third set of buttons, for executing the function respectively associated with the selected button from said third set of buttons.

8. The menu manager of claim 7, further including means for visually indicating which buttons in said first, second and third set of buttons are presently selected.

9. The menu manager of claim 7, further comprising means for displaying on said display device a fourth set of buttons, each of which are associated with a fixed function, each fixed function being executed by said programmed apparatus in response to the use of said cursor control device to select a button from said fourth set of buttons associated with the function to be executed.

10. The menu manager of claim 7, further including means for storing information indicative of which buttons in said first, second and third set of buttons were immediately previously selected, and means responsive to a selected button in said first set of buttons for automatically selecting the buttons corresponding to the button information stored in said storing means.

11. A method of providing a plurality of menu selections on a display screen of a computer, comprising the steps of:

defining first, second, and third display zones on said display screen, simultaneously displaying first, second, and third sets of selection buttons in said first, second, and third display zones, respectively, displaying in said first zone, a first set of menu options, wherein each option is associated with a user's selection of a button in said first zone, selecting and displaying a second set of menu options, in response to a user's selection of one of the menu options in said first set of menu options, wherein each menu option in said second set is displayed in association with a selection button in said second set of selection buttons, and wherein each menu option in said second set is associated with a broad group of functions to be carried out by said computer, and selecting and displaying a third set of menu options, in response to a user's selection of one of the menu options in said second set of menu options, wherein each menu option in said third set of menu options is associated with a specific function to be carried out by said computer.

12. The method of claim 11, further including the step of indicating when a menu option has been selected by changing the visual representation of the selected button from that of the buttons associated with non-selected menu options.

13. The method of claim 11, further comprising the steps of defining a third zone on the display screen, displaying a third set of selection buttons within said third zone, and defining and displaying within said third zone a fixed set of menu options, wherein each option is associated with a selection button in said third set of selection buttons.

14. The method of claim 12, further including the steps of continually storing the previous set of menu options selected, and automatically returning to the previous set of menu options in response to a selected menu option in said first set of menu options.

* * * * *